US010664716B2

(12) United States Patent
Liu et al.

(10) Patent No.: US 10,664,716 B2
(45) Date of Patent: May 26, 2020

(54) PORTABLE SUBSTANCE ANALYSIS BASED ON COMPUTER VISION, SPECTROSCOPY, AND ARTIFICIAL INTELLIGENCE

(71) Applicant: VISPEK INC., Hamden, CT (US)

(72) Inventors: Wei Liu, Hamden, CT (US); Ran Zhao, Pittsburgh, PA (US); Huamin Li, Palo Alto, CA (US); Jinqing Huang, Hamden, CT (US)

(73) Assignee: VISPEK INC., Hamden, CT (US)

( * ) Notice: Subject to any disclaimer, the term of this patent is extended or adjusted under 35 U.S.C. 154(b) by 33 days.

(21) Appl. No.: 16/039,461

(22) Filed: Jul. 19, 2018

(65) Prior Publication Data

US 2019/0026586 A1 Jan. 24, 2019

Related U.S. Application Data

(60) Provisional application No. 62/534,440, filed on Jul. 19, 2017.

(51) Int. Cl.
*G06K 9/32* (2006.01)
*G06K 9/46* (2006.01)
(Continued)

(52) U.S. Cl.
CPC .......... *G06K 9/3233* (2013.01); *G01J 3/0272* (2013.01); *G01J 3/06* (2013.01);
(Continued)

(58) Field of Classification Search
CPC ............. G06K 2009/4657; G06K 9/46; G06K 9/3233; G06K 9/22
See application file for complete search history.

(56) References Cited

U.S. PATENT DOCUMENTS 8,401,292 B2 3/2013 Park et al.
9,217,670 B2 12/2015 Kim et al.
(Continued)

FOREIGN PATENT DOCUMENTS

WO 2008/016309 A1 2/2008

OTHER PUBLICATIONS

Nieto et al., "Non-Destructive Detection of Hollow Heart in Potatoes Using Hyperspectral Imaging", Aug. 29, 2011, Computer Science Department, Universidade de Vigo, Campus As Lagoas 32004 Ourense, Spain, https://pdfs.semanticscholar.org/aaa0/15c15dc3e5cbaa250965fb7613405b60e340.pdf.
(Continued)

*Primary Examiner* — John J Lee
(74) *Attorney, Agent, or Firm* — Wiggin and Dana LLP; Anthony D. Sabatelli (57) ABSTRACT

A portable complete analysis solution that integrates computer vision, spectrometry, and artificial intelligence for providing self-adaptive, real time information and recommendations for objects of interest. The solution has three major key components: (1) a camera enabled mobile device to capture an image of the object, followed by fast computer vision analysis for features and key elements extraction; (2) a portable wireless spectrometer to obtain spectral information of the object at areas of interest, followed by transmission of the data (data from all built in sensors) to the mobile device and the cloud; and (3) a sophisticated cloud based artificial intelligence model to encode the features from images and chemical information from spectral analysis to decode the object of interest. The complete solution provides fast, accurate, and real time analyses that allows users to obtain clear information about objects of interest as well as personalized recommendations based on the information.

21 Claims, 6 Drawing Sheets

(51) Int. Cl.
G06T 7/11 (2017.01)
G06N 7/00 (2006.01)
G01J 3/06 (2006.01)
G01J 3/02 (2006.01)
G06N 5/04 (2006.01)
G06K 9/22 (2006.01)
G06K 9/62 (2006.01)
G06K 9/20 (2006.01)
G06T 7/00 (2017.01)
G06N 3/04 (2006.01)
G06N 3/08 (2006.01)
G06K 9/00 (2006.01)

(52) U.S. Cl.
CPC ............ *G06K 9/2018* (2013.01); *G06K 9/22* (2013.01); *G06K 9/46* (2013.01); *G06K 9/4628* (2013.01); *G06K 9/4661* (2013.01); *G06K 9/627* (2013.01); *G06N 3/0445* (2013.01); *G06N 3/0454* (2013.01); *G06N 3/084* (2013.01); *G06N 5/046* (2013.01); *G06N 7/005* (2013.01); *G06T 7/0004* (2013.01); *G06T 7/0012* (2013.01); *G06T 7/11* (2017.01); *G01J 2003/068* (2013.01); *G06K 9/00362* (2013.01); *G06K 9/00664* (2013.01); *G06K 2009/4657* (2013.01); *G06T 2207/20084* (2013.01); *G06T 2207/30088* (2013.01); *G06T 2207/30128* (2013.01); *G06T 2207/30188* (2013.01); *G06T 2207/30196* (2013.01)

(56) References Cited

U.S. PATENT DOCUMENTS

| | | | |
|---|---|---|---|
| 9,349,297 | B1 | 5/2016 | Ortiz et al. |
| 9,445,713 | B2 | 9/2016 | Douglas et al. |
| 9,551,616 | B2 | 1/2017 | McQuilkin et al. |
| 9,587,982 | B2 * | 3/2017 | Goldring ............... G01J 3/0256 |
| 2012/0233033 | A1 | 9/2012 | Calman et al. |
| 2015/0177066 | A1 * | 6/2015 | Kim ..................... G01J 3/2823 356/302 |
| 2016/0063734 | A1 | 3/2016 | Divakaran et al. |
| 2016/0109371 | A1 | 4/2016 | Blair |
| 2016/0150213 | A1 | 5/2016 | Mutti et al. |
| 2019/0011621 | A1 * | 1/2019 | Karafin .................. G02B 25/00 |

OTHER PUBLICATIONS

Ukwatta et al., "Machine vision system for automated spectroscopy", Machine Vision and Applications (2012), Springer, Jan. 1, 2012, vol. 23, pp. 111-121.

Oswald, D, "With a built-in molecular spectrometer, this phone can identify any material", Digital Trends, Jan. 4, 2017, 3 pages.

* cited by examiner

PORTABLE SUBSTANCE ANALYSIS BASED ON COMPUTER VISION, SPECTROSCOPY, AND ARTIFICIAL INTELLIGENCE

FIELD OF THE INVENTION

The present invention relates to a portable, i.e. on-the-go, complete solution that integrates computer vision, portable spectrometry, and artificial intelligence for providing self-adaptive, real time information and recommendations for an object of interest. The solution has three major key components: (1) a camera enabled mobile device to capture images of the object, followed by fast computer vision analysis for feature and key element extraction; (2) a portable wireless spectrometer to obtain spectral information of the object at area of interest, followed by transmission of the data (data from all built in sensors) to the mobile device and the cloud; and (3) a sophisticated cloud based artificial intelligence model to encode the feature from the images and information from spectral analysis to decode the object of interest. The complete solution provides fast, accurate, and real time analyses that allows user to obtain clear information, such as spectral data, about the object of interest as well as personalized recommendations. The present invention relates to a portable substance analysis method and system. The invention improves the quality of substance analysis in mobile devices implemented in linking three major components: computer vision, spectroscopy, and artificial intelligence.

BACKGROUND OF THE INVENTION

The chemical content and composition of substances can be analyzed by obtaining the spectral signature using spectroscopy, such as visible and infrared spectroscopy. Although it has been widely deployed in a variety of industrial settings, consumer level usage of spectral analyses is seldom used, mostly due to the lack of low cost portable spectrometer devices, and the lack of reliable data processing and modeling system. In recent years, miniature and low cost spectrometers have been made possible by the advancement in chipset technology. However, it still remains one of the leading challenges to build a solution and model to provide fast, reliable analysis of spectral data obtained by the spectrometer devices. In addition, it is necessary to overcome the challenges due to the heterogeneity of the samples to be analyzed. Particularly, there are three major problems longing to be resolved before a complete solution becomes available to consumers: 1. A well calibrated spectrometer device that provides reliable, reproducible spectral data of object of interest with low derivation; 2. A system to reliably record the objects to be analyzed and the area/location to be analyzed, this is due to the fact that many objects in real life are heterogeneous in chemical content and composition at different parts of the object; 3. A model that can handle all information, including spectral analysis data, environ-mental data (temperature, humidity, etc.), type of object analyzed, and location on the object analyzed, to establish a fast, yet reliable, prediction model to provide real time information and recommendations based on the user-end analysis.

Computer vision technology has matured and performed well in many visual perception tasks such as facial expression recognition and human motion recognition. Before the emerging of deep networks, people relied on hand crafted visual features which are fed into a traditional machine learning classifier such as random forest, support vector machines to predict object class or scene understanding. A variety of ways of finding image features and descriptions were proposed that push forward the field of computer vision, such as scale-invariant feature transform (SIFT) and Histogram of oriented gradients. However, traditional computer vision methods are trained using predefined features which might not be the optimal features for the prediction task. Also, with these traditional computer vision methods, it is not always possible to select the optimal parameters of the image processing for all cases of lightning and shadows. To solve the above problems, others have proposed different variants of deep convolution neural networks from the earliest LeNet until the recent ResNet. In general, most of architectures are composed of three core building blocks for image feature extraction purposes: a convolutional layer, a RELU layer and a Maxpooling layer. Each filter in the convolutional lay will output an image local spatial feature map. It is common to periodically insert a pooling layer in-between successive convolutional layers, which progressively reduce the spatial size of the representation to reduce the number of parameters. Along with the output layer(e.g., a fully connected feed forward or softmax layer), the entire convolutional network outperforms on broad image classification and understanding problems.

Visible and infrared spectroscopy is a powerful technique to obtain information of the chemical content and composition in substance by accessing its molecular vibrations. Infrared absorbance/reflectance spectroscopy and Raman spectroscopy can also be used to collect valuable data of objects. Upon being exposed to light (electromagnetic radiation), molecules within the object of interest interact with the electromagnetic fields, leaving a molecular signature in the reflected or transmitted light. The interaction is selective for different molecules and different energies (i.e. wavelengths) of the electromagnetic radiation, hence the molecular signature of the object of interest can be mapped as a spectrum, where the response of object to the electromagnetic radiation is recorded as a function of the wavelength or wavenumber of the electromagnetic radiation, hence a spectrum. Many spectrometers are available on the market for a variety of industrial applications, a few are newly introduced to the consumer market for daily applications. However, it is critical to have a working model for interpreting or analyzing the spectral data, since spectral data without a reliable model are of limited value.

Current state-of-the-art artificial intelligence techniques (deep neural networks) scale up the learning capacity of the traditional machine learning techniques, which allows one to find hidden and useful patterns in massive datasets. These achievements are mainly from advances in feature representation learning and neural network component and structure design. In terms of representation learning, in the present invention we have trained an end-to-end system and push the model to learn the most informative features corresponding to the prediction tasks instead of extracting predefined handcrafted features. Computer vision is one of the most salient and success use cases. In terms of neural network component and structure design, a variety of networks have been proposed to solve different problems. For instance, variants of convolutional neural networks are used to learn the complex spatial structure of data. Variants of recurrent neural networks are used to model the long-term temporal dependency of data. With a better feature, representation and customized learning capacity, the above models outperform in most prediction and regression tasks. On the other hand, combined with classic learning models such as active learning, reinforcement learning, deep learning models also show capabilities for adaptation and personalization in a variety of AI-level tasks. With massive datasets, there might be an explosive number of potential states in reinforcement learning.

SUMMARY OF THE INVENTION

In order to overcome the difficulty in modeling and challenges in handling heterogeneous samples in traditional spectroscopic techniques, we introduce a novel complete solution to establish a self-adaptive artificial intelligence using macroscopic image assessment with microscopic spectral analysis. The combination of computer vision and spectroscopy creates a synergy that allows the substance analysis that can be achieved by cross examination of multi-dimensional data. The utilization of artificial intelligence allows the model to self-evolve and improve over time as the data set scales. The complete solution can extend the application regions of traditional spectroscopic techniques and provides fast and, reliable, yet user friendly information to the end user. The methods of the present invention can be widely applied in varieties of settings in the daily life of end users.

BRIEF DESCRIPTION OF THE DRAWINGS

A more detailed understanding of the invention can be had from the following description of the embodiments, given by way of example and to be understood in conjunction with the accompanying drawings.

DETAILED DESCRIPTION OF THE INVENTION

It is an object of this invention to provide a complete solution for substance analysis combining macroscopic image assessment with microscopic spectral analysis of the content and composition, e.g. the chemical composition, of an object. The present invention solves the problems of spectroscopic techniques on heterogeneous samples that are very difficult, if not possible, for which to build a useful model. In addition, the utilization of multi-feature based artificial intelligence can provide fast and reliable, yet user friendly information to the end user. The present invention can be widely applied in a variety of daily settings, providing convenience and benefits to the life of the end user.

1. The present invention relates to a method for analyzing an object for one or multiple characteristic properties using a camera enabled device, a multi-wavelength spectrometer, and artificial intelligence comprising the steps of:
    (a) obtaining an image of the object using a camera enabled device;
    (b) using computer vision to extract one or more features of the object;
    (c) using computer vision to identify one or more regions of interest within one or more of the features of the object;
    (d) scanning the one or more regions of interest of the object using a multi-wavelength spectrometer over a plurality of wavelengths;
    (e) measuring a spectrophotometric value for each of the wavelengths of step (d) to generate a spectrum of each region of interest of the object;
    (f) using artificial intelligence to integrate the spectrum generated in step (e) with the features extracted in step (b) with the regions of interest identified in step (c) to generate an analysis of the one or multiple characteristic properties of the object.

2. In another aspect the present invention relates to a method wherein said one or more features of the object is a global feature or a local feature.

3. In another aspect the present invention relates to a method wherein said spectrophotometric value is a high dimensional local feature.

4. In another aspect the present invention relates to a method wherein in step (a) the image obtained by the camera enabled device is captured using a photon detection array (such as a photo diode array or an active pixel sensor) for detecting light having a wavelength from about 200 nm to about 1100 nm.

5. In another aspect the present invention relates to a method wherein the computer vision extracting one or more features of the object comprises:
    downsampling the image of object by performing a convolution with a filter bank using an encoder network;
    reducing image resolution; and
    inducing a set of feature maps of the image with the global and local features.

6. In another aspect the present invention relates to a method wherein the typical encoder network comprises 8-16 convolutional layers in a VGG16 network.

7. In another aspect the present invention relates to a method wherein the typical encoder network comprises 13 convolutional layers in a VGG16 network.

8. In another aspect the present invention relates to a method wherein the plurality of wavelengths of steps (d) and (e) are selected from about 400 nm to about $1 \times 10^4$ nm.

9. In another aspect the present invention relates to a method wherein the plurality of wavelengths of steps (d) and (e) are selected from about 400 nm to about 700 nm.

10. In another aspect the present invention relates to a method wherein the plurality of wavelengths of steps (d) and (e) are selected from about 700 nm to about $1 \times 10^4$ nm.

11. In another aspect the present invention relates to a method wherein the object is selected from humans, animals, plants, and inanimate image objects.

12. In another aspect the present invention relates to a method wherein the feature is selected from water content, carbohydrate content, protein content, or color.

13. In another aspect the present invention relates to a method wherein the computer vision to identify one or more regions of interest further comprises:
    upsampling the encoded feature maps for pixel-wise segmentation;
    segmenting a region of interest of the object for spectroscopic measurements;
    assigning a degree of interest on the region of interest of the object;

highlighting the region of interest of the object for spectroscopic measurements;
obtaining a spectrum on the region of interest of the object; and
condensing the image representation by a fully connected feedforward network.

14. In another aspect the present invention relates to a method wherein the integration of the spectrum and the regions of interest comprises:
inputting both the global and local features with the spectrum of the region of interest by a fusion multimodal probabilistic model; and outputting a final prediction of the characteristics of the object.

15. In another aspect the present invention relates to a method wherein the multimodal probabilistic model comprises a group of classic discriminative classifiers, said classic discriminative classifiers selected from logistic regression, support vector machine, softmax classifier, or random forests for predicting a single label.

16. In another aspect the present invention relates to a method wherein the multimodal probabilistic model further comprises a group of models simulating the dynamics of the object of interest and means making the prediction by considering the long-term structure within sequences.

17. In another aspect the present invention relates to a method further comprising a fine-tuning procedure to achieve personalized implementation, wherein the fine-tuning procedure comprises:
implementing a standardized model for each user;
applying a matrix factorization to a collected dataset from the user;
leveraging the bioinformation of the user;
initiating a personalized recommendation;
acquiring both explicit and implicit feedback from the user; and
applying an optimization model to improve the quality of the personalized recommendation to an end user.

18. In another aspect the present invention relates to a method wherein the optimization model is selected from stochastic gradient descent (SGD), root mean square propagation (RMSprop), adaptive gradient method (Adagrad), Adam optimizer (Adam), or contextual multi-arm bandit model.

19. In another aspect the present invention relates to a system for analyzing an object for one or multiple characteristic properties, comprising:
(a) a processor;
(b) a storage medium;
(c) a spectrophotometer;
(d) a camera enabled mobile device; and
(e) a cloud based artificial intelligence.

20. In another aspect the present invention relates to a system wherein the spectrophotometer is operational over a plurality of wavelengths selecting from about 400 nm to about $1 \times 10^4$ nm;

21. In another aspect the present invention relates to a system wherein the camera enabled mobile device comprises a photon detection array for detecting light having a wavelength from about 200 nm to about 1100 nm.

Still other objects and advantages of the invention will in part be apparent from the specification and drawings.

This invention introduces a complete solution to tackle all three problems in consumer level usage of spectral analyses by integrating computer vision, portable spectroscopic analyses, and artificial intelligence. First, the portable low-cost spectrometer with built-in calibration materials allow self-calibration for each scan. The self-calibrated spectral data therefore contain more accurate responses, e.g. chemical responses, from objects of interest, regardless of the differences in light source, photo-sensor response, and environmental parameters such as temperature and humidity. Secondly, the camera enabled device based computer vision artificial intelligence provides real time information to extract global or local features of the object of interest. Regions of interest of the object can be then highlighted for spectroscopic measurement to solve the heterogeneity problem of the substance analyzed. Finally, the artificial intelligence analyzes the information from image processing and spectral analysis to provide a real time interpretation and recommendation to the end user.

Figure 1:
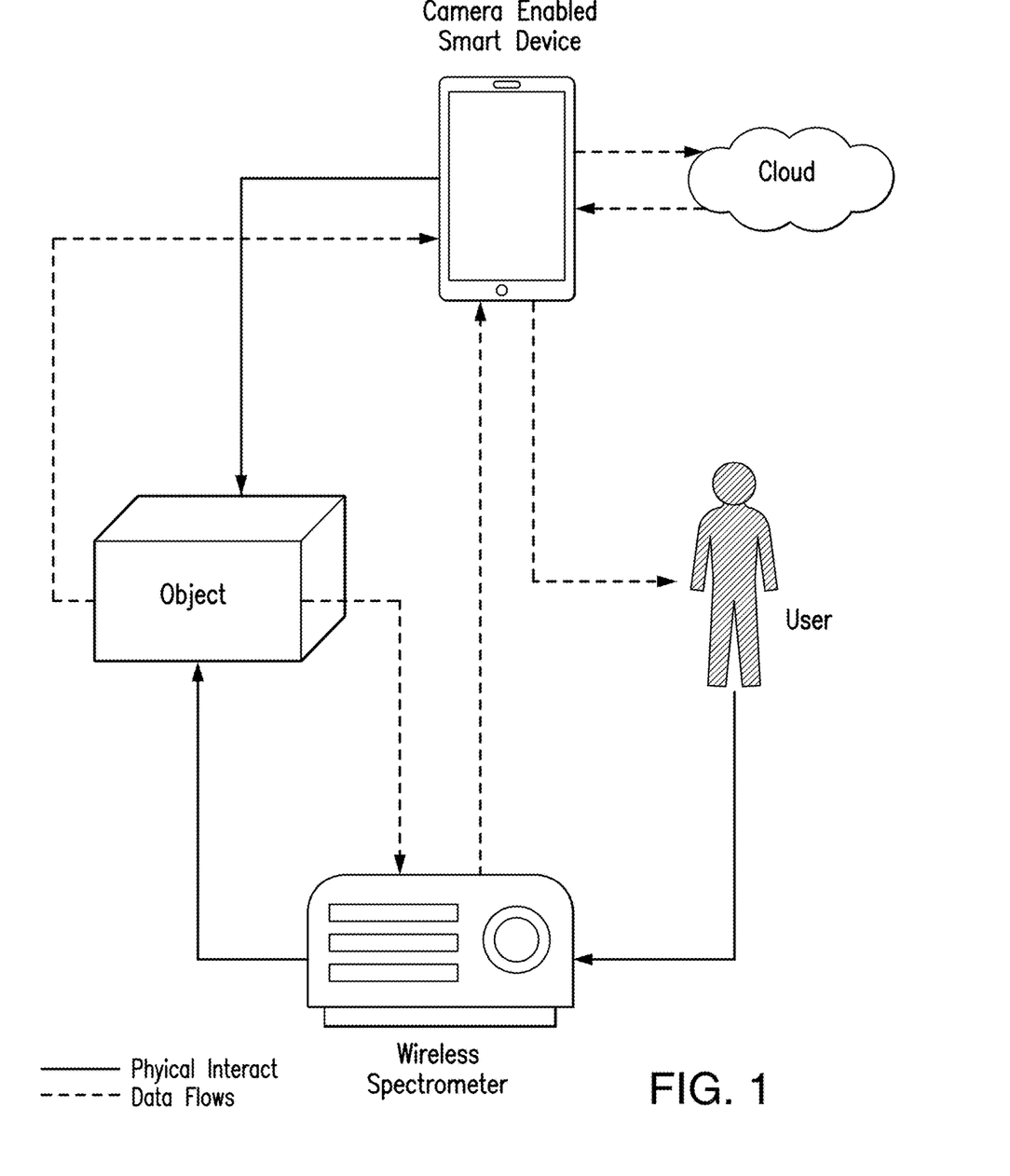
FIG. 1 illustrates a typical implementation of the complete solution described in the invention.

A typical embodiment, as seen in FIG. 1, comprises a wireless spectrometer and camera enabled smart device connected to the cloud server. The wireless spectrometer can be either a commercially available device or comprises homemade modules, with the capability to probe spectral responses at different location of the object of interest, with data communication capacity to the smart device, the communication implementation means including but are not limited to, wired connection, Bluetooth connection, ZigBee connection, Wi-Fi connection, and Z-Wave connection. The user utilizes both the camera enabled smart device and the portable spectrometer to perform the substance analysis. The camera enabled smart device is used to acquire an image of the object of interest, and the spectrometer is used to obtain spectral information, e.g. chemical or molecular information, of the object of interest. The data obtained are sent to the cloud based artificial intelligence for analysis. The returned information and/or recommendation is provided to the user on the smart device.

Figure 2:
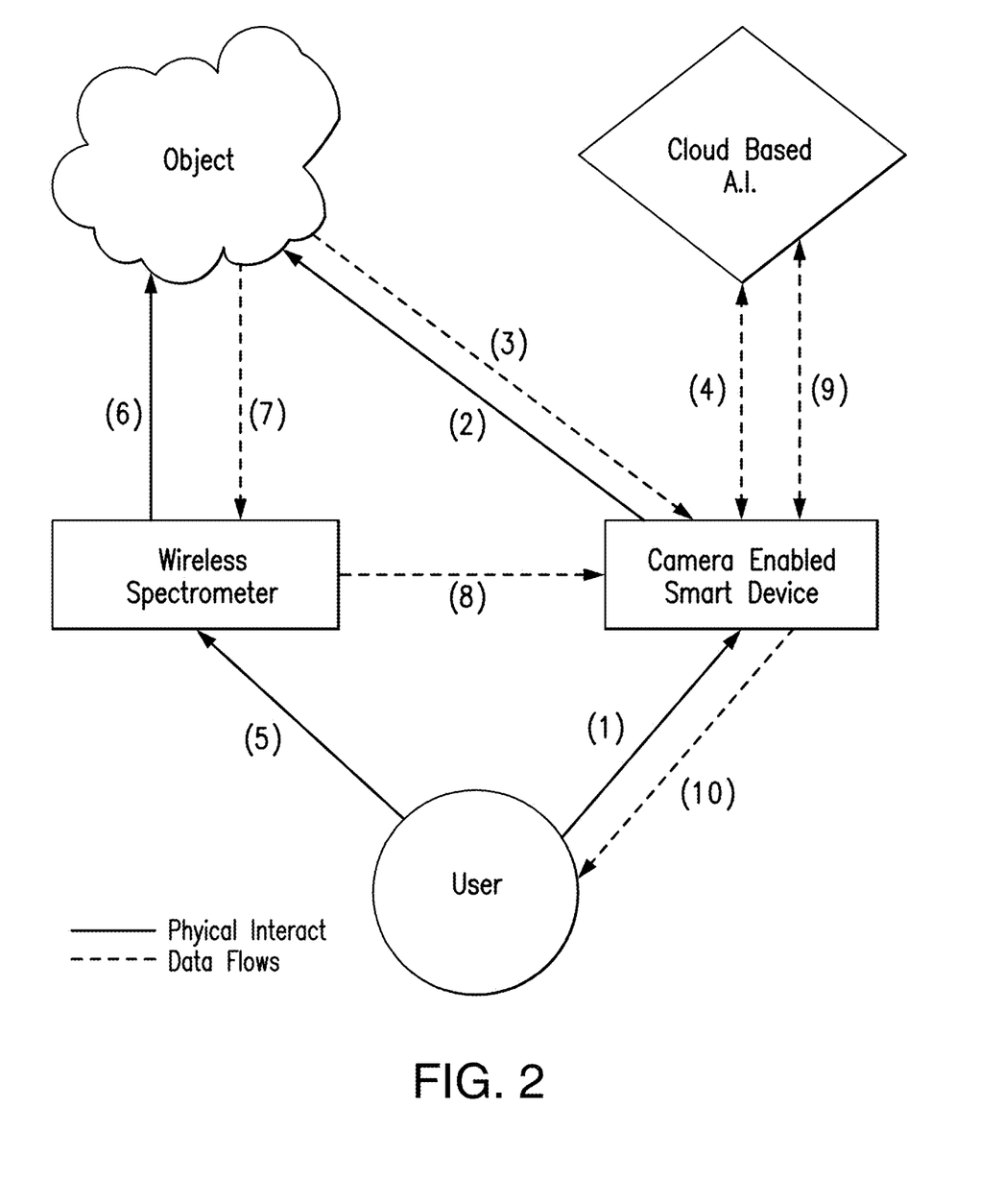
FIG. 2 illustrates a schematic representation of the data flow of the complete solution in practice.

The data flow of the complete solution in practice is illustrated in FIG. 2. The substance analysis starts with the user using the camera enabled smart device (1) to obtain an image (3) of the object (2). The smart device then automatically sends the image to the cloud for fast image recognition and feature extraction, feeding relevant information back to the smart device (4). The smart device displays information of the object with areas of interests, followed by inviting the user to utilize the spectrometer (5) to scan the area of interests (6). At this stage, the spectrometer performs the auto calibration using built-in standards. After the user scans the area of interests, the spectral data (7) obtained by the spectrometer is sent to the smart device (8), packed with the previous information obtained from the object image by computer vision, then sent to the cloud based artificial intelligence for deeper analysis (9). The return results (10), are then interpreted and presented on the smart device to the user.

In our solution, computer vision can run fast recognition and analyses of images that carry real life information. Specifically, we utilize a state-of-the-art deep convolutional encoder-decoder architecture for multi-dimensional data analysis, handling our data from both computer vision and spectral analysis of different dimensions, leading to substance analysis in real time. First, the convolutional encoder network is used to extract a low resolution representation of image, providing global and local features of image. The architecture of the encoder network is topologically identical to the 13 convolutional layers in the VGG16 network, which extracts low resolution image features. Specifically, each encoder firstly performs the convolution with a filter bank to induce a set of feature maps. Then the max-pooling with a 2×2 window and stride 2 sub-samples the target image. This process is used to translate invariance for the later stage robust classification task. In principle, the encoder learns the representation of areas in an image which will be fused with selected spot features from the spectrometer to decode the object of interest. Secondly, the convolutional decoder network is then engaged to segment areas of interest for spectroscopic measurements. The decoder in the network upsamples its input feature maps using the memorized max-pooling indices from the corresponding encoder feature maps. Last, both the global/local image features and spectral signature are fed into a fuse multimodal probabilistic model to output the final prediction of the object of interest. Those uncovered high-dimensional feature representations are then fed to a trainable soft-max classifier which serve two main roles: (1) to segment areas of the object and (2) to assign a degree of interest on each area and highlight the zone for spectrometric data gathering.

With the highlighting of the areas of interest for the spectrometer by computer vision analysis, we conduct in-depth chemical context analyses through extracting spectral features. The spectral analysis in the complete solution utilizes a miniature spectrometer with communication functionality enabled. Upon the initialization when user uses a smart device to capture the image of the object of interest, the spectrometer automatically connects to the smart device and runs a calibration to reduce deviations. A standard is built in within the spectrometer to allow self-calibration before sending data to the smart device for cross analysis. The spectrometer utilizes light (electromagnetic radiation) in the visible and/or infrared regions to interact with molecules in the sample of interest, followed by detecting the reflected light that carries molecular fingerprint information. The spectral analysis data are calibrated and normalized, then sent to the smart device as a spectrum data array. Features in the spectrum are extracted by artificial intelligence to characterize chemical contents and compositions in the sample of interest.

The chemical content analyses process involves initial training using scientific knowledge and ground truth for the samples, followed by shot-by-shot reinforce learning with self-recognized labeling. The results from the artificial intelligence can continue to extract features within the spectral data that are highly convoluted and deeply correlated to the chemical content and composition of the sample of interest. Thus, deep neural networks are deployed to learn the approximate state in order to make learning a policy applicable within limited numbers of interactions.

Figure 3:
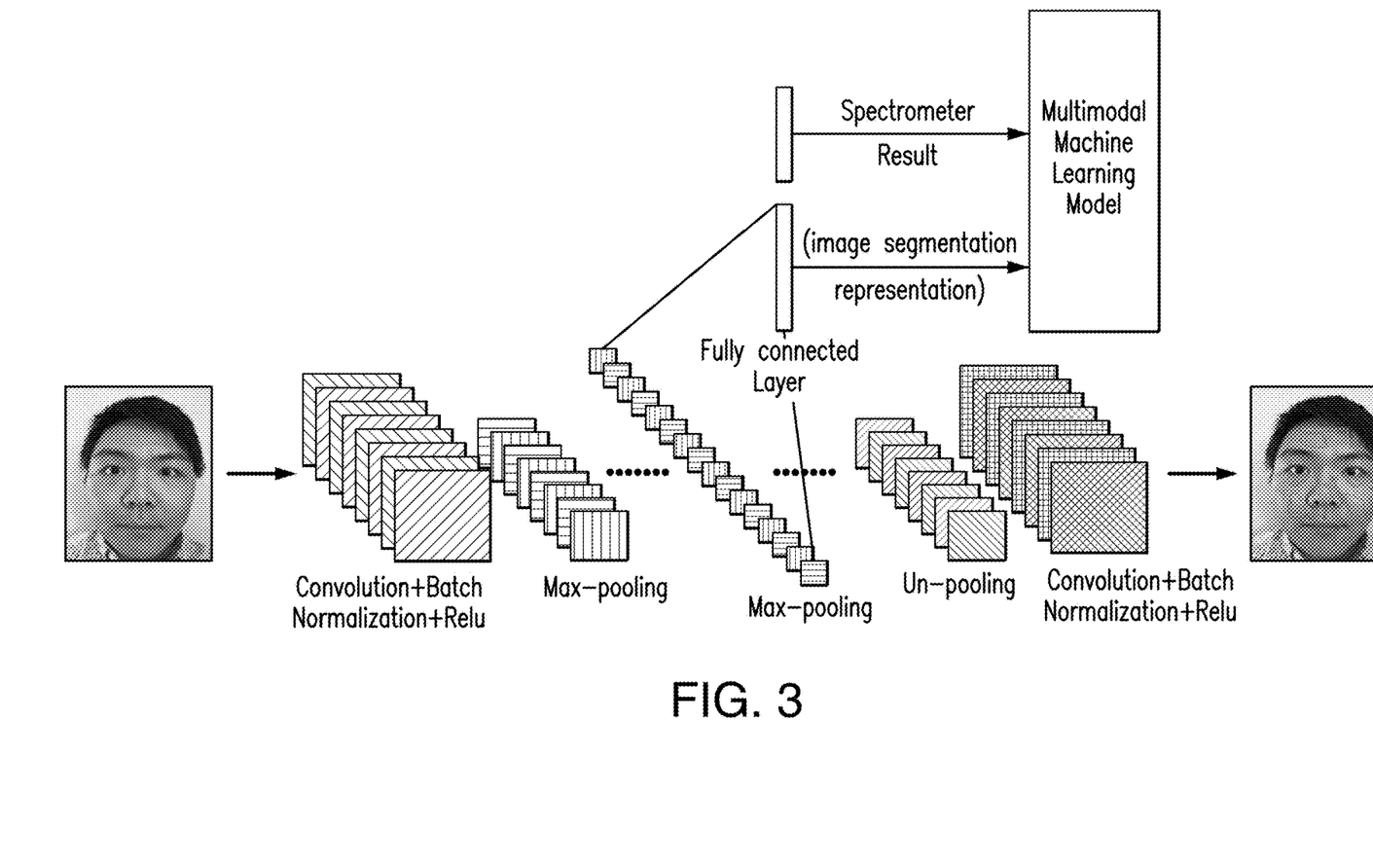
FIG. 3 illustrates a schematic representation of the infrastructure deployment of the cloud based artificial intelligence model handling local requests with both computer vision image input and spectral data from sensors in the portable device.

FIG. 3 shows the detailed structure of the deep neural network of the present invention for both highlighting the areas of interest for the spectrometer as well as fusing multimodalities to predict the object of interest. It is worth noting that this is a trained standardized model through collective intelligence. In principle, a convolutional encoder-decoder architecture will firstly extract a low resolution representation of the image in its encoder network. Then, the output will be separately fed into both the decoder network and a fully connected feedforward network. The decoder network is responsible for segmenting areas of the image and highlighting the areas of interest for the spectrometer. A fully connected feedforward network will condense the image representation. In the last step, with the dense image representation and spectral signature, a late fuse multimodal probabilistic model is applied to output the final prediction for the object of interest.

Meanwhile, active learning provides another solution to model the uncertainty in the interaction and to query the labels of the most informative samples in order to speed up the process for personalization adaptation.

In principle, the present invention utilizes a supervised learning model to train the standardized model for predicting the objects of interest, which benefits from collective intelligence and a large collected dataset. Moreover, the present invention leverages the power of active learning models for personalization purposes in addition to a pre-trained standardized model through interacting with each individual customer. Concretely speaking, in the first step of training the standardized model, with the visual features extracted from the deep convolution encoder-decoder architecture and spectrum features from the smart spectrometer, the present invention applies a late fusion multimodal machine learning model to predict the object of interest. Since there are different objects of interest to predict for solution, there are the following multimodal probabilistic models including but not limited to: A group of classic discriminative classifiers such as logistic regression, support vector machine, softmax classifier and random forests for predicting a single label. A group of models have capabilities of modeling the dynamics of the object of interest and thus make predictions considering the long-term structure within sequences. First of all, one of the salient solutions is memory network based deep models such as memory networks and recurrent entity networks. The model of the present invention will automatically store historical predictions and feedback from the user in its external large memory and read relevant information through attention mechanism before generating final predictions. Secondly, recurrent neural networks such as an LSTM network capture long-term dependencies in classification tasks.

In the second step, the model is fine-tuned and learns to achieve personalization through interacting with each individual user. There are the following models including but not limited to: active learning, reinforcement learning, multi-arm bandith, finite Markov decision processes. Along with the interaction, the model will take the user's feedback as a reward/penalize function and thus optimize its internal policy to maximize the user experience.

Figure 4:
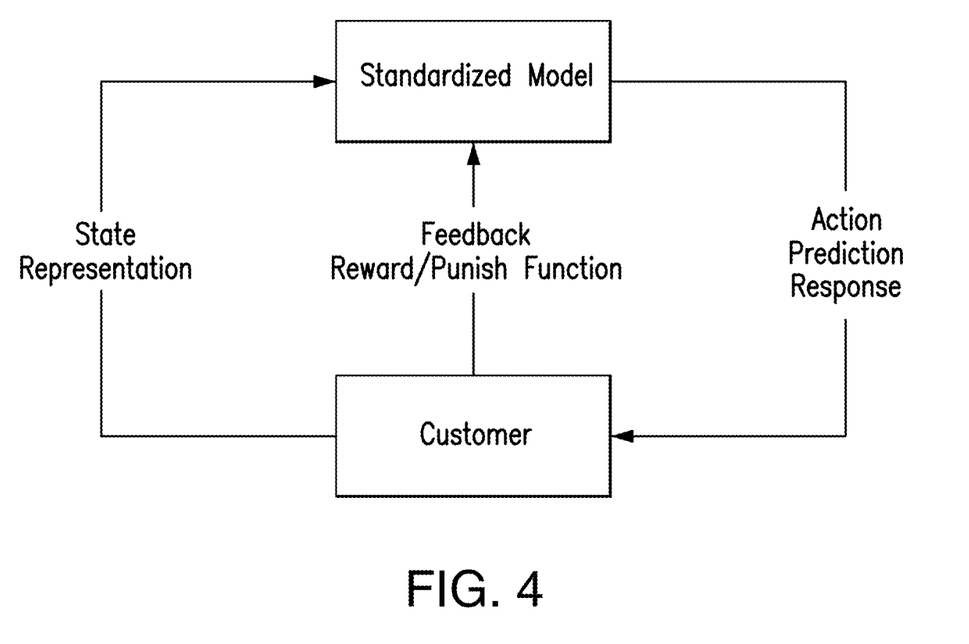
FIG. 4 illustrates a schematic representation of the interaction between the standardized model and end customer.

FIG. 4 shows the mechanism of fine-tuning the standardize model to better personalize the method and system to each individual use. The implementation begins with a standardized model for each user. The standardized model is trained offline by applying a matrix factorization to the collected dataset as a generalized scaffold, which will leverage the bioinformation of the user and standardize the model to initiate the recommendation. Along with the interaction between the device and the user, it is possible to acquire both explicit feedback and infer implicit feedback from the user side. The contextual multi-arm bandit model can be applied for improving the quality of personalized recommendations through optimization of the user modeling. In this case, the present invention leverages the power of active learning or reinforcement learning to take into account the feedback from user. During the interaction, the model will keep track of the state of the user as well as modeling the uncertainty of the action or prediction. Thus, the model can selectively query the feedback from the user in some informative samples.

EXAMPLES

The following examples further describe and demonstrate embodiments within the scope of the present invention. The Examples are given solely for purpose of illustration and are not to be construed as limitations of the present invention, as many variations thereof are possible without departing from the spirit and scope of the invention.

Example 1

Skin Analysis

Embodiments using the solution in skin analysis allow the user to use the camera enabled device acquire an image of the face. The image of face is sent to the cloud based artificial intelligence for pattern recognition and feature extraction. The biomarkers and facial features, including but not limit to the skin color tone, wrinkles, skin pigmentation distribution, acne and blemishes, sagging skin, dark circles, visible pores, etc., can be recognized and highlighted on the device, with the areas of interest labelled. The device then instructs the user to apply the wireless spectrometer to scan the areas of interests to obtain spectral data. The spectral data is then sent to the cloud based artificial intelligence along with the area labels and facial features for comprehensive analysis. The analysis results are then transmitted back to the device to provide personalized information and recommendations for the user.

Figure 5:
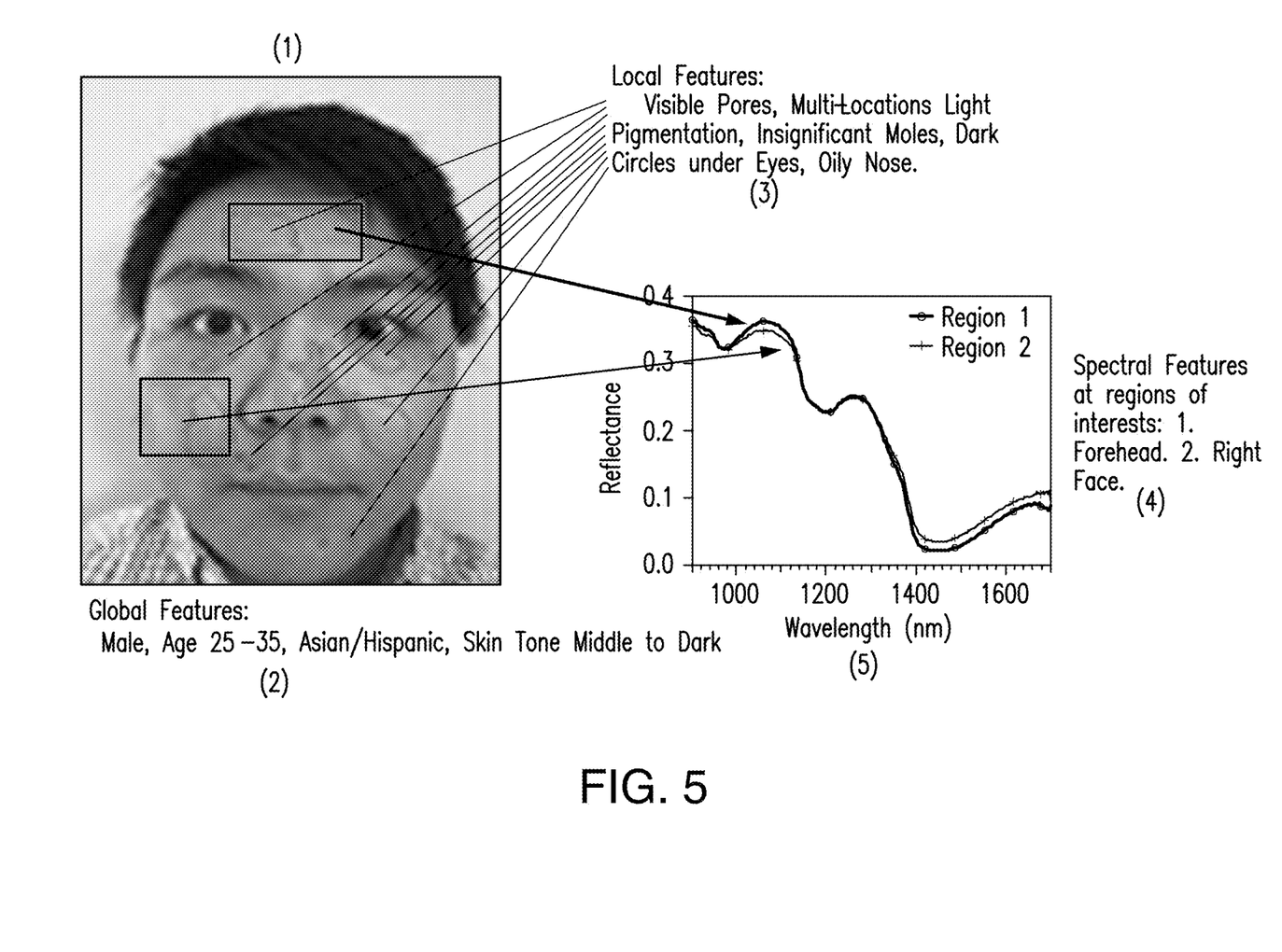
FIG. 5 illustrates an example of an embodiment for using the solution in skin analysis.

FIG. 5 shows a full example of this embodiment. The camera enabled device was used to obtain an image of the user face (1), followed by instant recognition of global features such as gender, age, race, and skin tone (2). The auto encoder-decoder was then engaged to segment the face to extract local features such as pores, pigmentation, moles, dark circles, and oily regions (3). The artificial intelligence automatically provides regions of interest (4) and the spectral features in these regions are obtained by using the portable spectrometer (5). The global features, local features, and spectral features are fused and feed into the artificial intelligence for interpretation and recommendations, including but not limit to overall skin scores, moisture level, protein level, oil level, pigmentation, pore/mole characteristics, and recommended executable actions and beneficial products.

Example 2

Daily Food Analysis

Embodiments using the solution for daily food analysis allow the user to use camera enabled device acquire an image of foods of interest. The image of the food is sent to the cloud based artificial intelligence for object recognition and geometry mapping. The species and features of the food, including but not limited to type of food, color, appearance, size, geometry, etc., can be recognized on the device, with areas of interests labelled. The device then instructs the user to apply the wireless spectrometer to scan the areas of interest to obtain spectral data. The spectral data are sent to the cloud based artificial intelligence along with the recognized species and features for comprehensive analysis. The analysis results are then transmitted back to the device to provide information (sweetness, sourness, water contents, freshness, etc.) and recommendations about the food of interest for the user.

Figure 6:
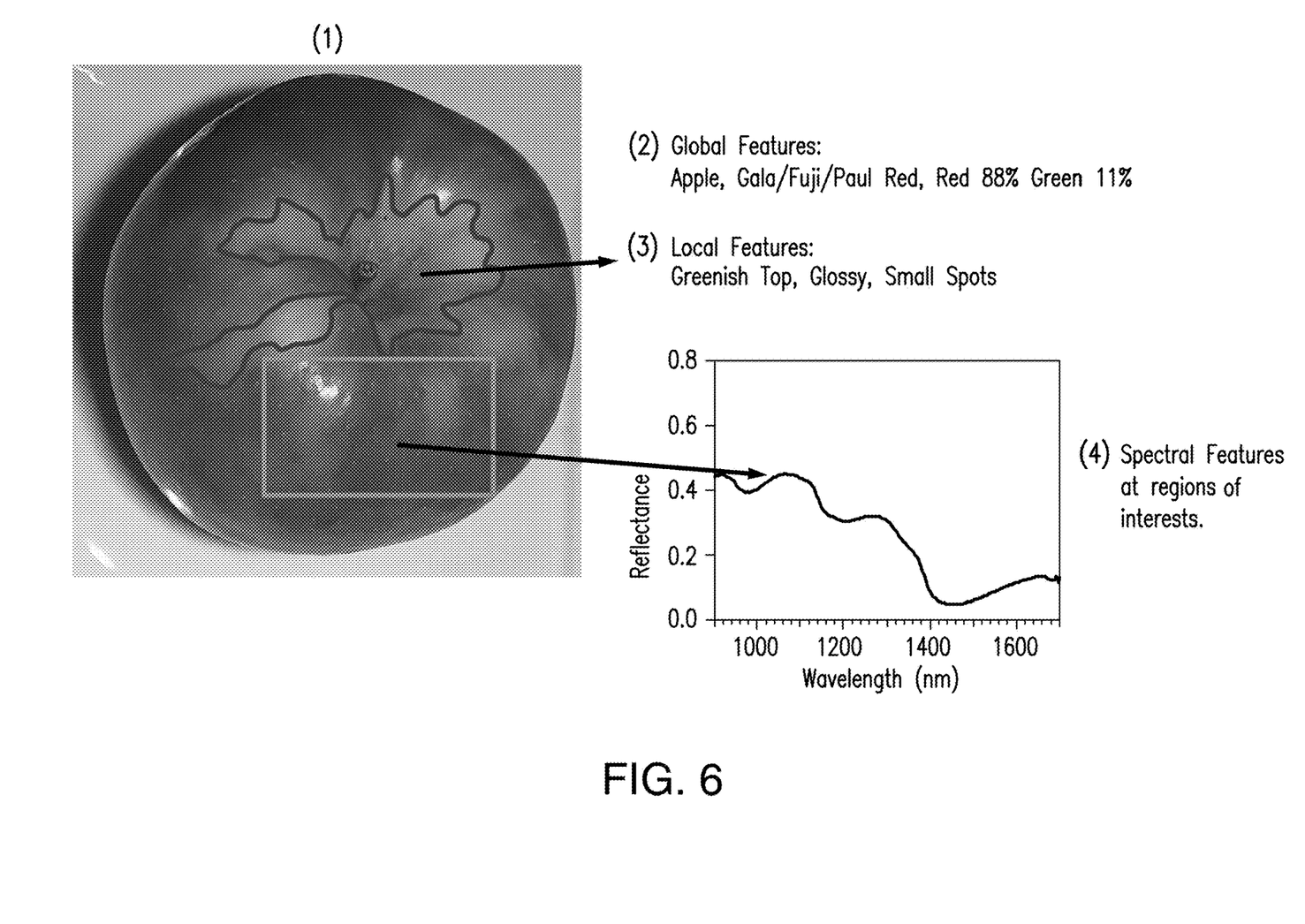
FIG. 6 illustrates an example of an embodiment for using the solution in daily food analysis.

FIG. 6 shows a full example of this embodiment. The camera enabled device was used to obtain an image of an apple (1), followed by instant recognition of its global features (2). The auto encoder-decoder was then engaged to segment the apple to extract local features such as color distribution, gloss, and spots (3). The artificial intelligence automatically provides regions of interest and the spectral features in these regions are obtained using the portable spectrometer (4). The global features, local features, and spectral features are fused and fed into the artificial intelligence for interpretation and recommendations, including but not limit to sweetness, sourness, water content, and freshness.

Example 3

Counterfeit Identification

Embodiments using the solution for counterfeit identification allow the user to use the camera enabled device acquire an image of the goods of interest. The image of good is sent to the cloud based artificial intelligence for objection recognition and geometry mapping. The species and features of the good, including but not limit to type of good, color, appearance, size, geometry, etc., can be recognized on the device, with the areas of interests labelled. The device then instructs the user to apply the wireless spectrometer to scan the areas of interest to obtain spectral data. The spectral data is sent to the cloud based artificial intelligence along with the recognized species and features for comprehensive analysis. The analysis results are then transmitted back to the device to provide authentication about the goods of interest to the user.

Example 4

Medical Pill Identification

Embodiments using the solution for medical pill identification allow the user to use camera enabled device to acquire an image of pills of interests. The image of pills is sent to the cloud based artificial intelligence for object recognition and geometry mapping. The species and features of the pills, including but not limit to type of pills, color, appearance, size, geometry, etc., can be recognized on the device, with the areas of interest labelled. The device then instructs the user to apply the wireless spectrometer to scan the areas of interests to obtain spectral data. The spectral data is then sent to the cloud based artificial intelligence along with the recognized species and features for comprehensive analysis. The analysis results are then transmitted back to the device to provide information (authenticity, effectivities, etc.) about the pills of interests to the user.

Example 5

Muscle Analysis

Embodiments using the solution for muscle analysis allow the user to use camera enabled device to acquire an image of the muscles of interest. The image of muscles is send to the cloud based artificial intelligence for object recognition and feature extraction. The biomarkers and features of the muscles, include but not limit to location of muscles, color, appearance, geometry, etc., can be recognized on the device, with the areas of interest labelled. The device then instructs the user to apply the wireless spectrometer to scan the areas of interest to obtain spectral data. The spectral data is then sent to the cloud based artificial intelligence along with the recognized biomarkers and features for comprehensive analysis. The analysis results are then transmitted back to the device to provide information (protein content, oxygen level, etc.) about the muscles of interests to user.

It will thus be seen that the objects set forth above, among those made apparent from the preceding description, are efficiently attained and, because certain changes can be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

INCORPORATION BY REFERENCE

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.
Equivalents The invention can be embodied in other specific forms without departing from the spirit or essential characteristics thereof. The foregoing embodiments are to be considered in all respects illustrative rather than limiting on the invention described herein. In the various embodiments of the present invention, where the term comprises is used, it is also contemplated that the embodiments consist essentially of, or consist of, the recited steps or components. Furthermore, the order of steps or the order for performing certain actions is immaterial as long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

The invention claimed is:

1. A method for analyzing an object for one or multiple characteristic properties using a camera enabled device, a multi-wavelength spectrometer, and artificial intelligence comprising the steps of:
   (a) obtaining an image of the object using a camera enabled device;
   (b) using computer vision to extract one or more features of the object;
   (c) using computer vision to identify one or more regions of interest within one or more of the features of the object;
   (d) scanning the one or more regions of interest of the object using a multi-wavelength spectrometer over a plurality of wavelengths;
   (e) measuring a spectrophotometric value for each of the wavelengths of step (d) to generate a spectrum of each region of interest of the object; and
   (f) using artificial intelligence to integrate the spectrum generated in step (e) with the features extracted in step (b) with the regions of interest identified in step (c) to generate an analysis of the one or multiple characteristic properties of the object,
   wherein the computer vision to extract one or more features of the object comprises:
   downsampling the image of the object by performing a convolution with a filter bank using an encoder network;
   reducing image resolution; and
   inducing a set of feature maps of the image with the global and local features.

2. The method according to claim 1 wherein said one or more features of the object is a global feature or a local feature.

3. The method according to claim 1 wherein said spectrophotometric value is a high dimensional local feature.

4. The method according to claim 1 wherein in step (a) the image obtained by the camera enabled device is captured using a photon detection array for detecting light having a wavelength from about 200 nm to about 1100 nm.

5. The method according to claim 4 wherein the photon detection array is selected from a photo diode array or an active pixel sensor.

6. The method according to claim 1 wherein the typical encoder network comprises 8-16 convolutional layers in a VGG16 network.

7. The method according to claim 6 wherein the typical encoder network comprises 13 convolutional layers in a VGG16 network.

8. The method according to claim 1 wherein the plurality of wavelengths of steps (d) and (e) are selected from about 400 nm to about $1 \times 10^4$ nm.

9. The method according to claim 8 wherein the plurality of wavelengths of steps (d) and (e) are selected from about 400 nm to about 700 nm.

10. The method according to claim 8 wherein the plurality of wavelengths of steps (d) and (e) are selected from about 700 nm to about $1 \times 10^4$ nm.

11. The method according to claim 1 wherein the object is selected from humans, animals, plants, and inanimate image objects.

12. The method according to claim 11 wherein the feature is selected from water content, carbohydrate content, protein content, or color.

13. The method according to claim 1 wherein the computer vision to identify one or more regions of interest comprises:
   upsampling the encoded feature maps for pixel-wise segmentation;
   segmenting a region of interest of the object for spectroscopic measurements;
   assigning a degree of interest on the region of interest of the object;
   highlighting the region of interest of the object for spectroscopic measurements;
   obtaining a spectrum on the region of interest of the object; and
   condensing the image representation by a fully connected feedforward network.

14. The method according to claim 1 wherein the integration of the spectrum and the regions of interest further comprises:
   inputting both the global and local features with the spectrum of the region of interest by a fusion multimodal probabilistic model; and outputting a final prediction of the characteristics of the object.

15. The method according to claim 14 wherein the multimodal probabilistic model comprises a group of classic discriminative classifiers, said classic discriminative classifiers selected from logistic regression, support vector machine, softmax classifier, or random forests for predicting a single label.

16. The method according to claim 14 wherein the multimodal probabilistic model further comprises a group of models simulating the dynamics of the object of interest and means making the prediction by considering the long-term structure within sequences.

17. The method according to claim 1 further comprising a fine-tuning procedure to achieve personalized implementation, wherein the fine-tuning procedure comprises:
   implementing a standardized model for each user;
   applying a matrix factorization to a collected dataset from the user;
   leveraging the bioinformation of the user;
   initiating a personalized recommendation;
   acquiring both explicit and implicit feedback from the user; and
   applying an optimization model to improve the quality of the personalized recommendation to an end user.

18. The method according to claim 17 wherein the optimization model is selected from stochastic gradient descent (SGD), root mean square propagation (RMSprop), adaptive gradient method (Adagrad), Adam optimizer (Adam), or contextual multi-arm bandit model.

19. A system according to claim 1 for analyzing an object for one or multiple characteristic properties, comprising:
   (a) a processor;
   (b) a storage medium;
   (c) a spectrophotometer;
   (d) a camera enabled mobile device; and
   (e) a cloud based artificial intelligence,
   wherein the spectrophotometer is operational over a plurality of wavelengths selected from about 400 nm to about $1 \times 10^4$ nm.

20. The system according to claim 19, wherein the camera enabled mobile device comprises a photon detection array for detecting light having a wavelength from about 200 nm to about 1100 nm.

21. A method for analyzing an object for one or multiple characteristic properties using a camera enabled device, a multi-wavelength spectrometer, and artificial intelligence comprising the steps of:
   (a) obtaining an image of the object using a camera enabled device;
   (b) using computer vision to extract one or more features of the object;
   (c) using computer vision to identify one or more regions of interest within one or more of the features of the object;
   (d) scanning the one or more regions of interest of the object using a multi-wavelength spectrometer over a plurality of wavelengths;
   (e) measuring a spectrophotometric value for each of the wavelengths of step (d) to generate a spectrum of each region of interest of the object; and
   (f) using artificial intelligence to integrate the spectrum generated in step (e) with the features extracted in step (b) with the regions of interest identified in step (c) to generate an analysis of the one or multiple characteristic properties of the object,
   wherein the computer vision to identify one or more regions of interest comprises:
   upsampling the encoded feature maps for pixel-wise segmentation;
   segmenting a region of interest of the object for spectroscopic measurements;
   assigning a degree of interest on the region of interest of the object;
   highlighting the region of interest of the object for spectroscopic measurements;
   obtaining a spectrum on the region of interest of the object; and
   condensing the image representation by a fully connected feedforward network.

* * * * *